(No Model.)
O. MATTOX.
ICE VELOCIPEDE.
No. 540,506. Patented June 4, 1895.
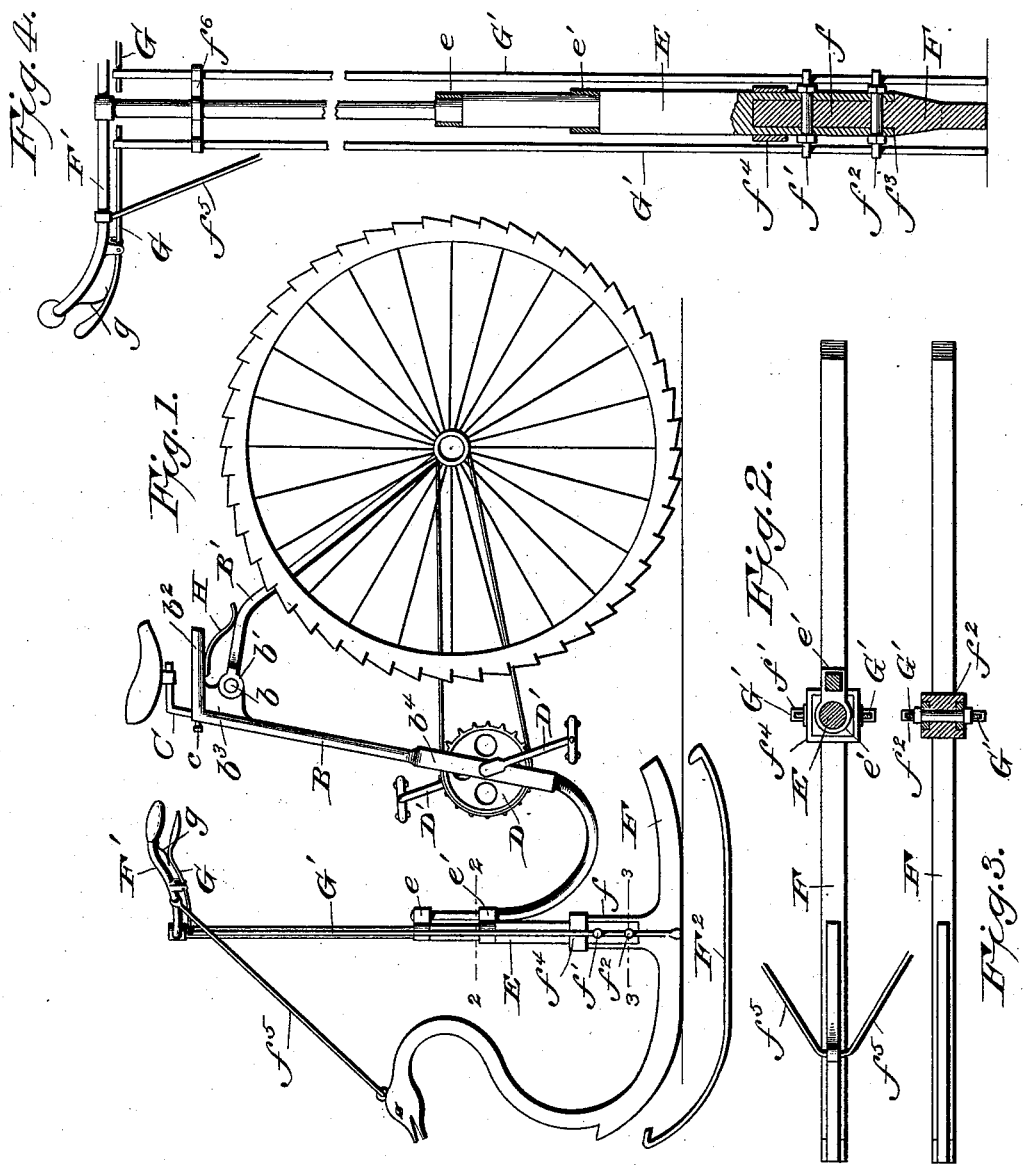
WITNESSES
Oliver Mattox
INVENTOR
Attorney

UNITED STATES PATENT OFFICE.

OLIVER MATTOX, OF WEST UNION, PENNSYLVANIA.

ICE-VELOCIPEDE.

SPECIFICATION forming part of Letters Patent No. 540,506, dated June 4, 1895.

Application filed April 4, 1895. Serial No. 544,476. (No model.)

*To all whom it may concern:*

Be it known that I, OLIVER MATTOX, a citizen of the United States of America, residing at West Union, in the county of Greene and State of Pennsylvania, have invented certain new and useful Improvements in Ice-Velocipedes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.
The object of my invention is to provide an ice velocipede of improved construction, and it consists of a frame which is mounted at its rear end upon a pair of drive-wheels and is connected at its forward end to the steering-post of a runner-frame, the main frame which carries the driving mechanism being constructed of two parts pivotally connected to each other so that the weight of the rider will serve to keep the sprocket-chain taut.

The invention also consists in providing the steering-post of the runner-frame with brakes which are located on opposite sides thereof and are independently operated by levers so that they may not only serve as brakes but also assist in steering the machine; and the invention further consists in the particular construction, arrangement and combination of the parts, as will be hereinafter fully set forth and specifically pointed out in the claims.

In the accompanying drawings, forming part of this specification, Figure 1 is a side view of a sled-propeller or ice-velocipede constructed in accordance with my invention. Figs. 2 and 3 are sectional views on the lines 2 2 and 3 3, respectively, of Fig. 1; and Fig. 4 is a front view of the steering-post, partly in section.
There are two driving-wheels A which are connected to each other by an axle upon which is supported the rear part of the main frame of the machine.

The main frame is made up of the parts B and B′ which are pivotally connected to each other at their upper ends by a pivot-bolt $b$, the part B′ consisting of two diverging bars which are mounted at their lower ends upon the axle of the main driving wheels, the upper ends of said bars being connected by a forging $b'$ which is apertured for the passage of the pivot-bolt $b$ hereinbefore referred to.

The part B of the main frame consists of a tubular bar which is curved forwardly at its lower end and is provided with a rearward extension $b^2$ at its upper end, an offset $b^3$ being provided at the angle to which the part B′ is pivoted as heretofore mentioned. The saddle-post C is let into the upper end of the part B and is adjustably secured therein by means of a set-screw $c$.

Upon the lower portion of the part B of the main frame is rigidly secured a reinforcing sleeve $b^4$ through which passes transversely the crank-axle upon which the main sprocket-wheel D is keyed, the crank-arms D′ being provided at their ends with pedals of any approved construction.

The forward portion of the part B of the main frame is connected to a vertical steering-post E by means of couplings $e$ and $e'$ which encircle the post, said post being enlarged immediately below each coupling to provide a bearing shoulder therefor, as shown in Fig. 4. The lower end of the steering-post is bifurcated for the attachment thereto of a runner F, said runner being provided with an upwardly-projecting member $f$ which fits within the bifurcated end of the post and is secured therein by bolts $f'$ and $f^2$, the ends of said bolts being extended and provided with vertical apertures for the purpose hereinafter set forth. The lower ends of the steering-post are stepped upon offsets $f^3$ formed on the member $f$ of the runner, and around the steering-post and upper end of the member $f$ is placed a band $f^4$ to more securely hold the parts in connection with each other.

To the upper end of the steering-post F are suitably connected the handle-bars F′ which are curved rearwardly in the usual manner and provided at their ends with handles as shown. The handle-bars are connected to the forward end of the runner F by rods $f^5$, the said forward end of the runner being curved upwardly in the manner shown in Fig. 1.

To the under side of each handle-bar F′ is pivoted a lever G to the inner end of which is connected a vertical brake-bar G' which passes through a bracket $f^6$ secured to the steering-post and through the vertical apertures in the ends of the bolts $f'$ and $f^2$, the lower ends of the brake-bars being adapted to be held normally above the lower edge of the runner by means of springs $g$ interposed between the handle bars and levers G as shown. The runner is provided with a wear-plate or shoe $F^2$ which is secured thereto by having its ends bent at an angle so as to fit over the ends of the runner.

It will be noted that the two parts of the main frame are connected to each other at their upper ends by a pivot-bolt and by this construction the drive-chain which passes over the main sprocket-wheel D and a sprocket-wheel on the axle is kept taut by the weight of the rider when seated in the saddle, and in order to prevent the chain being drawn too tight a strong flat spring H is interposed between the upper ends of the two parts of the main frame, and in operation this spring also tends to slacken upon the chain when in coasting the rider should shift his weight so that it comes upon the forward part of the machine.

Though I have described the machine as being provided with two rear wheels it is obvious that but a single wheel could be used and positioned between the diverging bars of the rear part of the main frame.

The machine hereinbefore described is easily guided by turning the runner through the medium of the steering-post and handle-bars, and when it is desired to bring the same to a standstill the levers on the under side of the handle-bars are both applied which will force the lower ends of the brake bars into the ice, and as said brake-bars are independently operated either one may be operated to assist in steering.

Having thus described my invention, what I claim as new, and desire to secure by Letters Patent, is—

1. In an ice-velocipede or sled-propeller, the combination, of a steering-post having handle-bars and a runner fixedly attached to its lower end, bolts $f'$ and $f^2$ which connect the runner and steering-post to each other and are provided with extended ends having vertical apertures, brake-bars located on opposite sides of the steering-post within the apertures in the bolts $f'$ and $f^2$, the upper ends of the brake-bars being guided by a bracket $f^6$ secured to the steering-post, and levers pivoted to the under side of the handle-bars and connected at their inner ends to the brake-bars, substantially as shown and described.

2. In an ice-velocipede or sled-propeller, the combination, of a steering-post bifurcated at its lower end, a runner having an upwardly-projecting member fitting within the bifurcated end of the steering-post, bolts $f'$ and $f^2$ passing through the lower end of the steering-post and upwardly-projecting member of the runner, said bolts being extended at their ends and provided with vertical apertures, brake-bars located on opposite sides of the steering-post within the apertures in the bolts $f'$ and $f^2$, levers pivoted to the under side of the handle-bars and connected at their inner ends to the brake-bars, and rods $f^5$ connected to the handle-bars and to the forward end of the runner, the forward end of the runner being curved upwardly as shown, as described and for the purpose set forth.

3. In an ice-velocipede or sled-propeller, the combination, of a runner-frame and a main seat supporting frame pivotally connected thereto, the main frame being made up of two parts which are pivotally connected to each other at their upper ends, the upper end of the forward part of the main frame being provided with a socket for the saddle-post, an axle supporting the rear part of the main frame and carrying the drive-wheels, a crank-shaft journaled in the forward part of the main frame and carrying a sprocket-wheel over which passes a chain for driving the axle, together with an interposed flat spring between the upper ends of the two parts of the main frame, the parts being combined so that the weight of the rider can be shifted to tighten or slacken the drive-chain, for the purpose set forth.

In testimony whereof I affix my signature in presence of two witnesses.

OLIVER MATTOX.

Witnesses:
 FRANK B. SMITH,
 JOHN H. SMITH.